US010336953B2

(12) United States Patent
Chatron-Michaud et al.

(10) Patent No.: US 10,336,953 B2
(45) Date of Patent: Jul. 2, 2019

(54) OPTIMIZATION OF A DEASPHALTING PROCESS WITH THE AIM OF PRODUCING A FEED FOR A CARBON BLACK UNIT

(71) Applicant: IFP Energies nouvelles, Rueil-Malmaison (FR)

(72) Inventors: Pascal Chatron-Michaud, Lyons (FR); Jerome Majcher, Lyons (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 0 days.

(21) Appl. No.: 15/363,347

(22) Filed: Nov. 29, 2016

(65) Prior Publication Data

US 2017/0152450 A1   Jun. 1, 2017

(30) Foreign Application Priority Data

Nov. 30, 2015   (FR) ...................... 15 61558

(51) Int. Cl.
*C10G 55/06* (2006.01)
*C09C 1/48* (2006.01)
(Continued)

(52) U.S. Cl.
CPC ............... *C10G 55/06* (2013.01); *C09C 1/48* (2013.01); *C10G 7/06* (2013.01); *C10G 11/18* (2013.01);
(Continued)

(58) Field of Classification Search
CPC ........ C10G 65/00; C10G 65/02; C10G 65/06; C10G 11/18; C10G 21/003; C09C 1/48
See application file for complete search history.

(56) References Cited

U.S. PATENT DOCUMENTS 3,481,865 A * 12/1969 Samuels, Jr. ............. C09C 1/48
                                                        208/251 R
4,345,991 A *  8/1982 Stegelman ............. C10G 51/00
                                                        208/113
(Continued)

FOREIGN PATENT DOCUMENTS

BE          655799 A    3/1965
FR         1585338 A    1/1970
(Continued)

OTHER PUBLICATIONS

French Search Report dated Jul. 15, 2016, issued in corresponding FR 15/61.558, 8 pages.
(Continued)

*Primary Examiner* — Michelle Stein
(74) *Attorney, Agent, or Firm* — Millen, White, Zelano and Branigan, P.C.

(57) ABSTRACT

A process for producing a composition as a feed for producing carbon black starting from an atmospheric residue, in which said atmospheric residue is vacuum distilled in order to produce at least one vacuum distillate fraction and at least one vacuum residue fraction, said vacuum distillate fraction being treated in accordance with at least the following two steps in succession:

a step 1) for fluid catalytic cracking, producing a FCC residue, a step 2) for filtration of the fine solid particles contained in said FCC residue obtained from cracking step 1), resulting in a filtrate containing less than 300 ppm of particles below 10 microns, and in which, said vacuum residue fraction is supplied to a deasphalting step, resulting in a deasphalted vacuum residue (Continued)

fraction, at least a portion thereof being mixed with at least a portion of said filtrate from the filtration step 2) to form said composition.

11 Claims, 1 Drawing Sheet

(51) Int. Cl.
- *C10G 31/09* (2006.01)
- *C10G 55/00* (2006.01)
- *C10G 7/06* (2006.01)
- *C10G 11/18* (2006.01)
- *C10G 21/00* (2006.01)

(52) U.S. Cl.
CPC ........... *C10G 21/003* (2013.01); *C10G 31/09* (2013.01); *C10G 55/00* (2013.01); *C10G 2300/1074* (2013.01); *C10G 2300/208* (2013.01); *C10G 2300/44* (2013.01)

(56) References Cited

U.S. PATENT DOCUMENTS

| | | |
|---|---|---|
| 2013/0048537 A1 | 2/2013 | Noh et al. |
| 2013/0115518 A1* | 5/2013 | Tano ............... H01M 4/587 429/231.8 |

FOREIGN PATENT DOCUMENTS

| | | |
|---|---|---|
| FR | 3013716 A1 | 5/2015 |
| FR | 3014897 A1 | 6/2015 |
| GB | 1182890 * | 3/1970 |

OTHER PUBLICATIONS

English translation Abstract of FR3013716A1 published May 29, 2015, (1 page).
English translation Abstract of FR1585338A published Jan. 16, 1970, (1 page).
English translation Abstract of FR3014897A1 published Jun. 19, 2015, (2 pages).

* cited by examiner

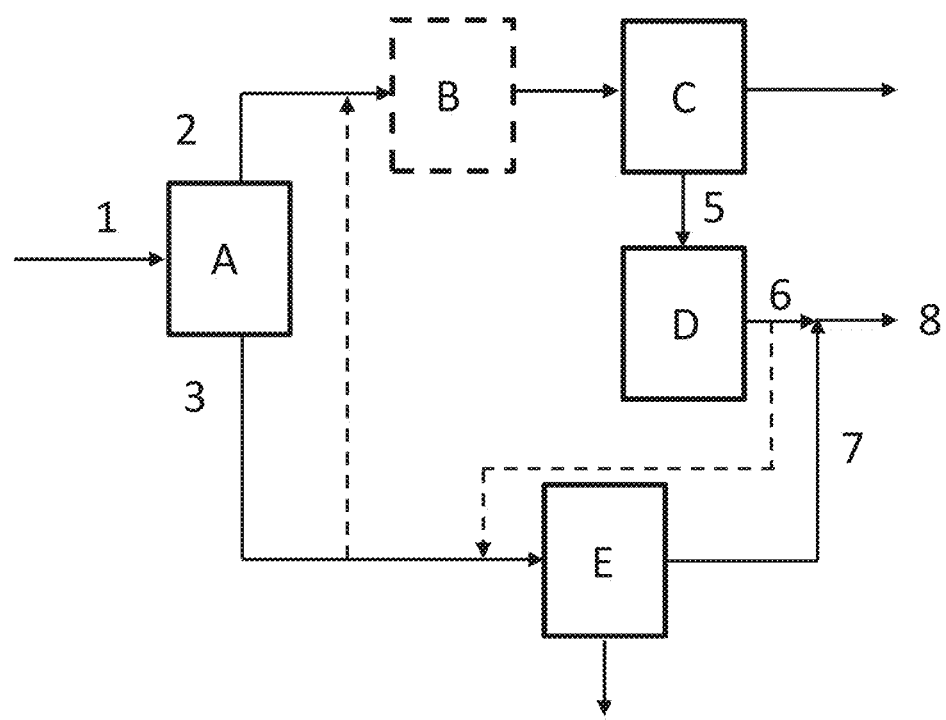

OPTIMIZATION OF A DEASPHALTING PROCESS WITH THE AIM OF PRODUCING A FEED FOR A CARBON BLACK UNIT

FIELD OF THE INVENTION

The treatment of certain residues from the oil refining and/or distillation unit makes them generally difficult to upgrade. Typically, atmospheric residues produce a vacuum distillate and a vacuum residue following vacuum distillation. Said distillate generally undergoes catalytic cracking which in turn results in a residue. A fluidized catalytic cracking (FCC) unit is generally used to convert heavy oil cuts which may or may not have been hydrotreated such as, for example, a hydrotreated vacuum distillate or a hydrotreated residue, into upgradable oil cuts such as propylene, gasoline, liquefied petroleum gas, LPG or indeed oils of the "Light Cycle Oil" (LCO) type which produce a gas oil. A highly aromatic residue remains at the bottom of the catalytic cracking unit, which residue has a distillation start point which is generally at about 360° C., which is generally known to the person skilled in the art as the "360+ slurry" cut. These various residues may in particular be upgraded as a cut for the production of carbon black.

Carbon black has applications in various manufacturing processes such as those for paint, varnishes, lacquers, plastics, fibres, ceramics, enamels, inks of the Indian ink type, or indeed those for certain materials (especially rubber for tyres). In addition, carbon black has been widely used in the past as carbon paper and in black typewriter ribbons, and in the present in black electrostatic powders for photocopiers.

Carbon black may also be incorporated into certain solids in order to increase their melting point. It is also frequently used as an adsorbent material in purification operations, for example for heavy polyaromatics, or indeed to remove dissolved coloured impurities and to fix the material in suspension, thereby forming aggregates of impurities which are easy to separate by filtration. Carbon black is also used as a food colouring (E152).

Carbon black is listed in the European Inventory for Existing Commercial Chemical Substances (EINECS) under accession number 215-609-9. It is classified into a number of grades in accordance with ASTM standard D1765.

PRIOR ART

The article "Upgrade FCC "slurry" oil with chemical settling aids", W. F. Minyard, World Refining, Jan. 1, 1999, Volume: 9, p 35-38) reports a study on the negative impact of the presence of catalyst fines in the residue from a residue fluidized catalytic cracking unit (RFCC) during upgrading thereof. A comparison between a cyclone type separator and a separator operated by settling with a flocculating chemical product was described. That article mentions the importance of providing, as the feed, a highly aromatic RFCC residue (obtained by very intense conversion of the RFCC) in order to obtain carbon black oil (CBO), needle coke, a feed for a hydrocracker, or a component of a commercial heavy fuel oil.

The article "Research progress in purification of FCC "slurry" oil and its application to chemical industry" by Bingcheng Cao which appeared in the review Petrochemical Technology on Jan. 1, 2012 (volume 41, pages 364-369) describes a purification of RFCC residues in order to produce carbon black oil or needle coke. The purifications cited are principally intended to remove catalyst fines: filtration, electrostatic separation, separation by centrifugation, separation by ceramic membrane.

Upgrading the various residues from the oil refining industry is being envisaged to a greater and greater extent. However, the upgrades described in the prior art are simply use of such residues as a feed in conversion processes such as RFCC, ebullated bed or slurry hydroconversion, coking or visbreaking without in any way carrying out any optimization of the quality of the feed represented by said residues. As a consequence, upgrading of said residues generally results in low yields and/or conversions.

In order to remove the impurities from the carbon black precursor feed in order to obtain a purer carbon black which is therefore more upgradable, starting from a catalytic cracking residue, a step for hydrotreatment of said residue is generally carried out, but the yield at the outlet from the carbon black unit is modest due to the addition of hydrogen during the hydrotreatment step.

Patent application FR 3 013 717 describes a process for the production of carbon black starting from a "360+ slurry" cut obtained from fluid catalytic cracking (FCC), comprising a specific hydrotreatment after the step for filtration of said "360+ slurry" cut obtained from a FCC unit prior to the step for the production of the carbon black. Said hydrotreatment step can be used to increase the yield of the carbon black production step and improve the purity of the carbon black obtained. However, a hydrotreatment is a process operating at high pressure and high temperature, necessitating the incorporation of hydrogen, and which induces a reduction in the quantity of products intended to be the reagents for the carbon black production step.

Thus, there is a genuine need for the treatment of residues to upgrade them in an optimized manner by using them as a feed in various processes, and in particular in carbon black production processes.

Surprisingly, the Applicant has been able to develop an improved process for the production of a composition intended to be used as a feed for a carbon black production step resulting from a combination of at least a portion of a vacuum residue treated in a specific manner in a solvent deasphalting unit and at least one fluid catalytic cracking residue termed the "360+ slurry" cut, without a hydrotreatment step. More precisely, the Applicant has been able to dispense with this hydrotreatment step prior to the carbon black production step by introducing a solvent deasphalting step.

SUBJECT MATTER OF THE INVENTION

Thus, the invention concerns a process for the production of a composition for use as a feed for a step for the production of carbon black starting from an atmospheric residue, in which said atmospheric residue is vacuum distilled in order to produce at least one vacuum distillate fraction and at least one vacuum residue fraction, said vacuum distillate fraction being treated in accordance with at least the following two steps in succession:
  a step 1) for fluid catalytic cracking, producing a FCC residue,
  a step 2) for filtration of the fine solid particles contained in said FCC residue obtained from cracking step 1), resulting in a filtrate containing less than 300 ppm of particles below 10 microns,
and in which,
said vacuum residue fraction is supplied to a deasphalting step, resulting in a deasphalted vacuum residue fraction, at least a portion thereof being mixed with at least a portion of said filtrate obtained in the filtration step 2) in order to form said composition.

The composition intended to be used as a feed for a carbon black production step does not undergo hydrotreatment.

One advantage of the present invention is that a process is carried out which operates at moderate temperature and pressure and does not require the incorporation of hydrogen.

Another advantage of the present invention is the possibility of isolating the most aromatic cut of the vacuum residue by liquid/liquid separation, which does not affect the quantity of products intended to be the reagents for the carbon black production step, in contrast to hydrotreatment, which involves reducing the quantity of aromatic carbon of the hydrotreated feed and thus the quantity of carbon black obtained.

DETAILED DESCRIPTION OF THE INVENTION

The description of the invention is made with reference to FIG. 1.

The Feed

In accordance with the invention, the feed (1) for the process in accordance with the invention is an atmospheric residue from crude oil. The atmospheric residue is obtained following atmospheric distillation of a crude oil, which may have a variety of origins, and the heaviest portion (with a boiling point which is generally more than 340° C. or even 370° C.) constitutes the atmospheric residue (1).

Vacuum Distillation

The feed (1) is initially introduced into a vacuum distillation column. Two fractions are obtained, a vacuum residue (3) and a vacuum distillate (2). The vacuum distillation in accordance with the invention may be carried out using any of the modes known to the person skilled in the art.

Treatment of Vacuum Distillate

In accordance with the invention, the vacuum distillate (2) acts as a feed for a fluid catalytic cracking step producing at least one FCC residue known as the "360+ slurry" (5).

The catalytic cracking step may be carried out using any of the modes known to the person skilled in the art.

The vacuum distillate may optionally be sent to a hydrotreatment and/or hydrocracking step prior to the catalytic cracking step. Said hydrotreatment and/or hydrocracking step can be used to remove the impurities present in the feed, which means that cleaner products can be obtained from the outlet from the FCC step.

Said hydrotreatment and/or hydrocracking step is advantageously carried out in accordance with techniques which are well known to the person skilled in the art and in the presence of conventional hydrotreatment and/or hydrocracking catalysts.

In accordance with a variation, a portion of the vacuum residue (3) obtained from vacuum distillation of the feed for the process in accordance with the invention may optionally be supplemented with vacuum distillate (2) upstream of said hydrotreatment and/or hydrocracking step.

In accordance with the invention, said FCC residue (5) obtained from the fluid catalytic cracking step, termed the "360+ slurry" cut, is then filtered in order to produce at least one filtrate (6).

Said filtration step is advantageously carried out using techniques which are well known to the person skilled in the art, such as the electrostatic filtration technique.

The aim of this filtration is to arrive at a content in the filtrate of less than 300 ppm and preferably less than 100 ppm, of catalyst fines below 10 microns.

Treatment of Vacuum Residue

In accordance with the invention, the vacuum residue (3) obtained from the step for distillation of the feed for the process in accordance with the invention is supplied to a deasphalting unit which produces at least one deasphalted vacuum residue fraction (7).

In accordance with a variation, residual feeds obtained from biomass or processes carried out on coal (bio-oils, coal tar) may also be used as a mixture with the vacuum residue as a co-feed for the deasphalting step.

The operating conditions for deasphalting depend on the configuration of the feed, the solvents available on the production site as well as on the purity and yields expected by the refiner, in the first place on the carbon black product.

The deasphalting step is carried out by liquid/liquid extraction.

The deasphalting step is operated at an extraction temperature in the range 30° C. to 350° C., preferably in the range 40° C. to 250° C. and more preferably in the range 50° C. to 200° C., and at a pressure which is advantageously in the range 0.1 MPa to 6 MPa.

The ratio of the volume of solvent or mixture of solvents to the mass of feed is generally in the range 1/1 to 10/1, preferably in the range 2/1 to 8/1, expressed in liters per kilogram.

The deasphalting solvent of the invention comprises at least one hydrocarbon selected from saturated hydrocarbons containing between 2 and 15 carbon atoms, preferably between 2 and 9 carbon atoms, alone or as a mixture.

Advantageously, the deasphalting solvent further comprises one or more cycloalkanes, one or more light naphtha type oil cuts and/or one or more aromatic compounds.

In the case in which the solvent comprises one or more aromatic compounds, said aromatic compound is advantageously selected from monoaromatic and diaromatic compounds.

In the case in which the aromatic compound is a monoaromatic compound, it is advantageously selected from benzene, toluene and xylenes, alone or as a mixture.

In one embodiment, the deasphalting is carried out with two solvents and two distinct extractors.

In a second embodiment, the deasphalting is carried out with a dual solvent and adjusting the ratio between the two extractors.

In another embodiment, the deasphalting is carried out with a solvent or a constant ratio of two solvents, but with a variation in the operating conditions between the two extractors (gradient of T°, pressure, internal extractor fittings, dwell time, etc).

The deasphalting step can be used to isolate precisely the most aromatic fraction of the vacuum residue (3) in order to produce a deasphalted vacuum residue (7) which is highly concentrated in aromatic carbon and which results in an increase in the quantity of carbon black which could be produced.

The term "aromatic carbon" means a carbon atom which forms part of an aromatic ring.

Advantageously, a portion of the filtrate (6) obtained from said filtration step may optionally be added to the vacuum residue (3) upstream of said deasphalting step.

Preparation of the Composition for Use as a Feed for a Step for the Production of Carbon Black (8)

In accordance with the invention, at least a portion of the deasphalted vacuum residue (7) is added to at least a portion of said filtrate (6) in order to produce a composition which is intended to be used as a feed for a step for the production of carbon black.

Said composition comprises less than 20% by weight of deasphalted vacuum residue, preferably less than 10% by weight and more preferably less than 5% by weight.

In accordance with the invention, the composition does not undergo hydrotreatment before it is used as a feed for a step for the production of carbon black.

BRIEF DESCRIPTION OF DRAWING

FIG. 1 represents the overall layout of the process in accordance with the invention. A feed (1) firstly undergoes a vacuum distillation (A) from which the vacuum residue (3) is supplied to a deasphalting unit (E) in order to produce a deasphalted vacuum residue fraction (7). The vacuum distillate (2) is supplied to a fluid catalytic cracking unit (C). The residue from the FCC step (5, "360+ slurry") is filtered at (D), then the filtrate (6) and the deasphalted vacuum residue (7) are combined in order to form the composition (8) in accordance with the invention, which is to be used as the feed for a step for the production of carbon black, not shown in the FIGURE. An optional step for hydrotreatment (B) may be carried out on the vacuum distillate (2). A portion of the vacuum residue (3) may be added to the vacuum distillate (2). A portion of the filtrate (6) may be added to the vacuum residue (3).

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding French application No. 15/61.558, filed Nov. 30, 2015 is incorporated by reference herein.

EXAMPLES

Example 1: Composition Comprising a Filtered FCC Residue and a Non-Deasphalted Vacuum Residue (Not in Accordance with the Invention)

Example 1 is not in accordance with the invention because the vacuum residue does not undergo deasphalting.

A Middle Eastern type atmospheric residue was vacuum distilled in order to produce a vacuum distillate and a vacuum residue with the aim of obtaining separation at 540° C.

The vacuum distillate represented 37% by weight of the atmospheric residue and the vacuum residue represented 63% by weight of the atmospheric residue.

The physico-chemical characteristics of the vacuum distillate and the vacuum residue are recorded in Table 1 below.

TABLE 1

|  | Vacuum distillate | Vacuum residue |
| --- | --- | --- |
| Aromatic carbon (% by weight) | 22 | 30 |
| Density (kg · m$^{-3}$) | 0.9439 | 1.026 |

TABLE 1-continued

|  | Vacuum distillate | Vacuum residue |
| --- | --- | --- |
| T50 (° C.) | 487 | 650 |
| Sulphur (% by weight) | 3.0 | 4.9 |
| [Ni + V] (ppm) | 4 | 195 |
| BMCI | 54 | 82 |

The BMCI (Bureau of Mines Correlation Index) is defined in accordance with the following formula, in which the abbreviation VABP designates the "volumetric" average temperature expressed in degrees Rankine and the abbreviation "Sp.Gr" designates the density.

$$BMCI = \frac{87552}{VABP(°R)} + 473.7 \times Sp.Gr. - 456.8$$

The vacuum distillate was sent for fluid catalytic cracking (FCC). The operating conditions for FCC are recorded in Table 2. The term C/O corresponds to the ratio of the flow rate of catalyst (C) over the flow rate of feed (O); the term ROT corresponds to the riser outlet temperature, and the term TRG corresponds to the temperature of the regenerator.

TABLE 2

| Catalyst | Silica-alumina |
| --- | --- |
| C/O | 6.4 |
| ROT (° C.) | 540 |
| TRG (° C.) | 720 |

The yields for the various cuts obtained from FCC, expressed as the percentage by weight, are given in Table 3 below.

TABLE 3

| Cut | Dry gases | LPG | Naphtha-180 | Kerosene 180-220 | LCO 220-360 | Coke | HCO/slurry 360+ |
| --- | --- | --- | --- | --- | --- | --- | --- |
| Yield (% by weight) | 3.9 | 14.1 | 40.5 | 5.6 | 17.7 | 6.5 | 11.7 |

The "360+ slurry" cut was filtered by passage over an electrostatic filter.

The physico-chemical characteristics of the FCC residue termed the "360+ slurry" cut after filtration are recorded in Table 4 below.

TABLE 4

| Aromatic carbon (% by weight) | 70 |
| --- | --- |
| Density (kg · m$^{-3}$) | 1.117 |
| T50 (° C.) | 400 |
| Sulphur (% by weight) | 5.5 |
| [Ni + V] (ppm) | <1 |
| BMCI | 144 |

The filtered "360+ slurry" and the vacuum residue obtained during vacuum distillation of the atmospheric residue were mixed to form a 97/3 by weight composition with the physico-chemical characteristics recorded in Table 5 below.

TABLE 5

| | |
|---|---|
| Aromatic carbon (% by weight) | 68.8 |
| Density (kg · m$^{-3}$) | 1.114 |
| T50 (° C.) | 408 |
| Sulphur (% by weight) | 5.4 |
| [Ni + V] (ppm) | 6 |
| BMCI | 142 |

This composition comprised a large quantity of sulphur and metals, which produced a poor quality carbon black product.

Example 2: Hydrotreated Composition Comprising a Filtered FCC Residue and a Non-Deasphalted Vacuum Residue (Not in Accordance with the Invention)

Example 2 was not in accordance with the invention, because the vacuum residue did not undergo deasphalting. In addition, Example 2 was not in accordance with the invention because the composition had been hydrotreated.

The composition obtained in Example 1 was treated in a hydrotreatment unit under the operating conditions recorded in Table 6 below.

TABLE 6

| | |
|---|---|
| HSV (h$^{-1}$) | 0.5 |
| Pressure (MPa) | 8 |
| Temperature (° C.) | 380 |
| Volume ratio, hydrodemetallization catalyst/hydrodesulphurization catalyst | 1/5 |

The physico-chemical characteristics of the effluents produced at the outlet from the hydrotreatment unit are indicated in Table 7 below.

TABLE 7

| | |
|---|---|
| Aromatic carbon (% by weight) | 50 |
| Density (kg · m$^{-3}$) | 1.094 |
| T50 (° C.) | 378 |
| Sulphur (% by weight) | 0.14 |
| [Ni + V] (ppm) | 5.4 |
| BMCI | 136 |

The hydrotreatment allowed the quantity of sulphur to be substantially reduced and the quantity of metals to be moderately reduced. However, the effect of the hydrotreatment was to considerably reduce the quantity of aromatic carbon, which implied that the quantity of carbon black which could be obtained was also considerably reduced.

Example 3: Composition Comprising a Filtered FCC Residue and a Deasphalted Vacuum Residue (in Accordance with the Invention)

The vacuum residue obtained in Example 1 was sent to a two-step deasphalting unit.

The first step was carried out with pentane at a total pressure of 4 MPa, an average temperature of 170° C. and with a volume ratio of solvent to the mass of feed, $V_{solvent}/m_{feed}$, of 6/1 L/kg.

The second step was carried out with propane, at a total pressure of 4 MPa, an average temperature of 60° C. and with a volume ratio of solvent to the mass of feed, $V_{solvent}/m_{feed}$, of 8/1 L/kg.

The physico-chemical characteristics of the deasphalted vacuum residue are recorded in Table 8 below.

TABLE 8

| | |
|---|---|
| Aromatic carbon (% by weight) | 65 |
| Density (kg · m$^{-3}$) | 1.002 |
| T50 (° C.) | 620 |
| Sulphur (% by weight) | 4.2 |
| [Ni + V] (ppm) | 73 |
| BMCI | 72 |

The filtered "360+ slurry" obtained in Example 1 and the deasphalted vacuum residue were mixed in order to form a 97/3 by weight composition with the physico-chemical characteristics which are recorded in Table 9 below.

TABLE 9

| | |
|---|---|
| Aromatic carbon (% by weight) | 69.9 |
| Density (kg · m$^{-3}$) | 1.113 |
| T50 (° C.) | 404 |
| Sulphur (% by weight) | 5.4 |
| [Ni + V] (ppm) | 2 |
| BMCI | 142 |

The proportion of aromatic carbon was higher in the composition obtained in Example 3 in accordance with the invention than in Examples 1 and 2 which were not in accordance with the invention. Thus, introducing a deasphalting step meant that the proportion of aromatic carbon in the composition for use as a feed for a step for the production of carbon black could be increased.

In addition, although the quantity of sulphur was not reduced by deasphalting, the quantity of metals was lower in the composition obtained in Example 3 in accordance with the invention. Thus, the carbon black obtained will be purer when the composition obtained in Example 3 is used as the feed than when the composition obtained in Example 1 is used as the feed.

The deasphalting step can be used to obtain an optimized feed for the production of carbon black by dispensing with the hydrotreatment step and increasing the quantity of aromatic carbon while maintaining a good BMCI level.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for the production of a composition suitable for use as a feed for the production of carbon black, comprising vacuum distilling an atmospheric residue in order to produce at least one vacuum distillate fraction and at least one vacuum residue fraction, subjecting said vacuum distillate fraction to at least the following two steps in succession:
   1) fluid catalytic cracking, producing a FCC residue,
   2) filtration of fine solid particles contained in said FCC residue obtained from cracking 1), resulting in a filtrate containing less than 300 ppm of particles below 10 microns;

deasphalting said vacuum residue fraction without hydrotreatment, resulting in a deasphalted vacuum residue fraction, at least a portion thereof being mixed with at least a portion of said filtrate obtained in the filtration 2) in order to form said composition.

2. The production process as claimed in claim 1, in which said composition comprises less than 20% by weight of deasphalted vacuum residue.

3. The production process as claimed in claim 2, in which said composition comprises less than 10% by weight of deasphalted vacuum residue.

4. The production process as claimed in claim 3, in which said composition comprises less than 5% by weight of deasphalted vacuum residue.

5. The production process as claimed in claim 1, in which said deasphalting is operated at an extraction temperature of 30° C. to 350° C. and at a pressure of 0.1 MPa to 6 MPa.

6. The production process as claimed in claim 1, in which said deasphalting is operated with a ratio of the volume of solvent or mixture of solvents to the mass of feed of 1/1 to 10/1, expressed in liters per kilogram.

7. The production process as claimed in claim 1, in which said deasphalting is operated with a solvent comprising at least one saturated hydrocarbon containing 2 to 15 carbon atoms.

8. The production process as claimed in claim 7, in which said solvent further comprises one or more cycloalkanes, one or more light naphtha type oil cuts and/or one or more aromatic compounds.

9. The production process as claimed in claim 8, in which said aromatic compound is a monoaromatic compound or a diaromatic compound.

10. The production process as claimed in claim 9, in which said monoaromatic compound is benzene, toluene or a xylene, used alone or as a mixture.

11. The production process as claimed in claim 1, in which said deasphalting is operated with two solvents and two distinct extractors.

* * * * *